United States Patent
Stone et al.

(10) Patent No.: US 9,546,056 B2
(45) Date of Patent: Jan. 17, 2017

(54) DOCK LEVELER SAFETY SUPPORTS

(71) Applicants: Bradley J. Stone, Port Washington, WI (US); David Holm, Kewaskum, WI (US); Leonard Kikstra, Jackson, WI (US); Matthew Sveum, Wauwatosa, WI (US); Norbert Hahn, Franklin, WI (US)

(72) Inventors: Bradley J. Stone, Port Washington, WI (US); David Holm, Kewaskum, WI (US); Leonard Kikstra, Jackson, WI (US); Matthew Sveum, Wauwatosa, WI (US); Norbert Hahn, Franklin, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 15/189,933

(22) Filed: Jun. 22, 2016

(65) Prior Publication Data
US 2016/0304301 A1    Oct. 20, 2016

Related U.S. Application Data

(63) Continuation of application No. 14/565,064, filed on Dec. 9, 2014, now abandoned.

(51) Int. Cl.
*B65G 69/00* (2006.01)
*B65G 69/28* (2006.01)

(52) U.S. Cl.
CPC ........ *B65G 69/2811* (2013.01); *B65G 69/2817* (2013.01); *B65G 69/2835* (2013.01); *B65G 69/2852* (2013.01)

(58) Field of Classification Search
CPC ............. B65G 69/2811; B65G 69/2817; B65G 69/2865; B65G 69/2852
USPC ................................................ 14/69.5–71.3
See application file for complete search history.

(56) References Cited

U.S. PATENT DOCUMENTS 4,376,319 A    3/1983    Bedford
5,481,774 A    1/1996    Hodges et al.
(Continued)

FOREIGN PATENT DOCUMENTS

GB          948657      2/1964

OTHER PUBLICATIONS

United States Patent and Trademark and Office, "Notice of Allowance", issued in connection with U.S. Appl. No. 14/565,064, mailed on Mar. 1, 2016, 25 pages.
(Continued)

*Primary Examiner* — Raymond W Addie
(74) *Attorney, Agent, or Firm* — Hanley, Flight & Zimmerman, LLC

(57) ABSTRACT

Dock leveler safety supports are disclosed herein. An example dock leveler disclosed herein includes a deck movable relative to a platform between a raised position and a lowered cross-traffic position when the dock leveler is in a working configuration. The deck to be inhibited from descending toward the lowered cross-traffic position when the dock leveler is in a service configuration. A first deck obstruction is movable relative to the deck between a secured position and an unrestrained position. The first deck obstruction in the secured position configures the dock leveler in the service configuration. The first deck obstruction in the unrestrained position configures the dock leveler in the working configuration. The first deck obstruction in the secured position to block movement of the deck toward the lowered cross-traffic position and the first deck obstruction in the unrestrained position to permit movement of the deck toward the lowered cross-traffic position. A first connector to couple the first deck obstruction to an obstruction actuator. The first connector including a rod, a sleeve to telescopically receive the rod, and a spring held in compression between the rod and the sleeve.

24 Claims, 10 Drawing Sheets

(56) References Cited

U.S. PATENT DOCUMENTS

| | | |
|---|---|---|
| 5,546,623 A | 8/1996 | Hahn |
| 5,600,859 A | 2/1997 | Hodges et al. |
| 5,651,155 A | 7/1997 | Hodges et al. |
| 5,996,156 A | 12/1999 | Massey |
| 6,035,475 A | 3/2000 | Alexander |
| 6,205,606 B1 | 3/2001 | Zibella et al. |
| 6,216,303 B1 | 4/2001 | Massey |
| 2005/0251933 A1 | 11/2005 | Mitchell et al. |
| 2015/0040329 A1 | 2/2015 | Palmersheim |
| 2016/0159587 A1 | 6/2016 | Stone et al. |

OTHER PUBLICATIONS

Rite-Hite Holding Corporation, "Photo of Manually Installed Leveler Stops," dated Nov. 4, 2014, 1 page.

Australian Patent Office, "Patent Examination Report No. 1", issued in connection with Australian Patent application No. 2015261625, on May 6, 2016, 9 pages.

European Patent Office, "Extended Search Report", issued in connection with European patent application No. 15003509.5, May 10, 2016, 9 pages.

Australian Patent Office, "Patent Examination Report No. 2", issued in connection with Australian patent application No. 2015261625, Aug. 12, 2016, 3 pages.

European Patent Office, "Communication pursuant to Rule 69 EPC", issued in connection with European patent application No. 15003509.5, Jun. 20, 2016, 2 pages.

United States Patent Office, "Restriction Requirement", issued in connection with U.S Appl. No. 14/679,239, May 26, 2016, 8 pages.

Australian Patent Office, "Notice of Acceptance", issued in connection with Australian patent application No. 2015261625, Oct. 24, 2016, 2 pages.

Canadian Patent Office, "Office Action", issued in connection with Canadian patent application No. 2913345, Oct. 11, 2016, 5 pages.

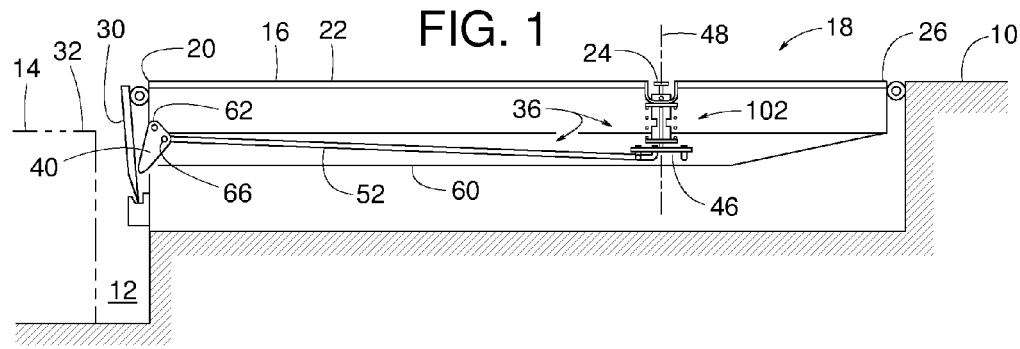
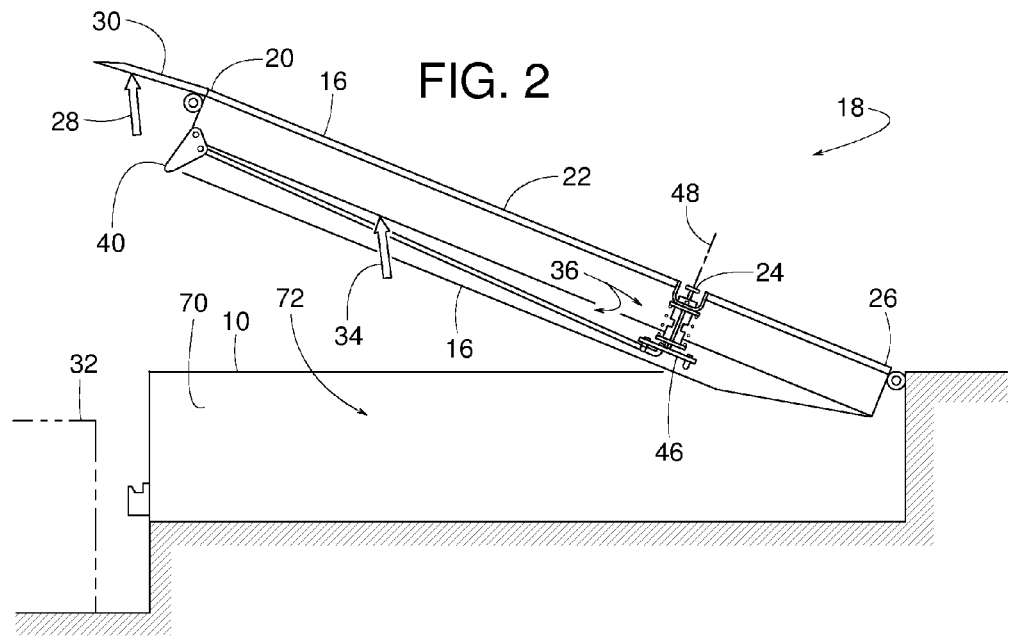
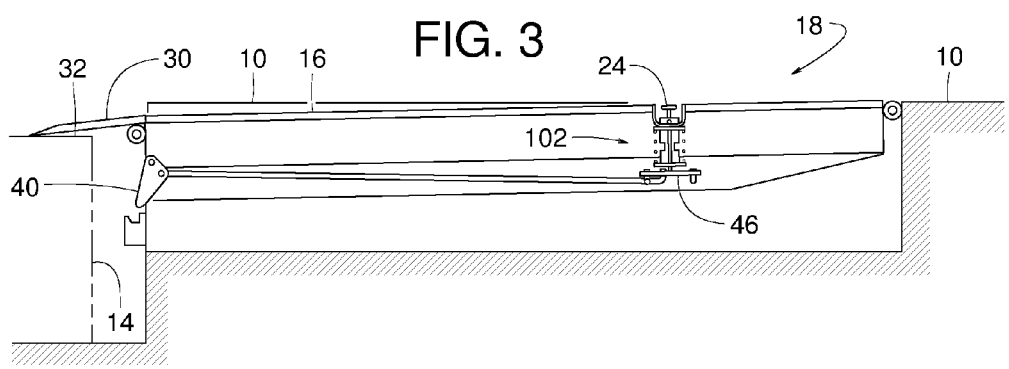

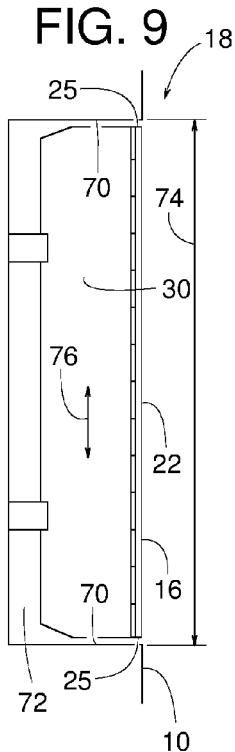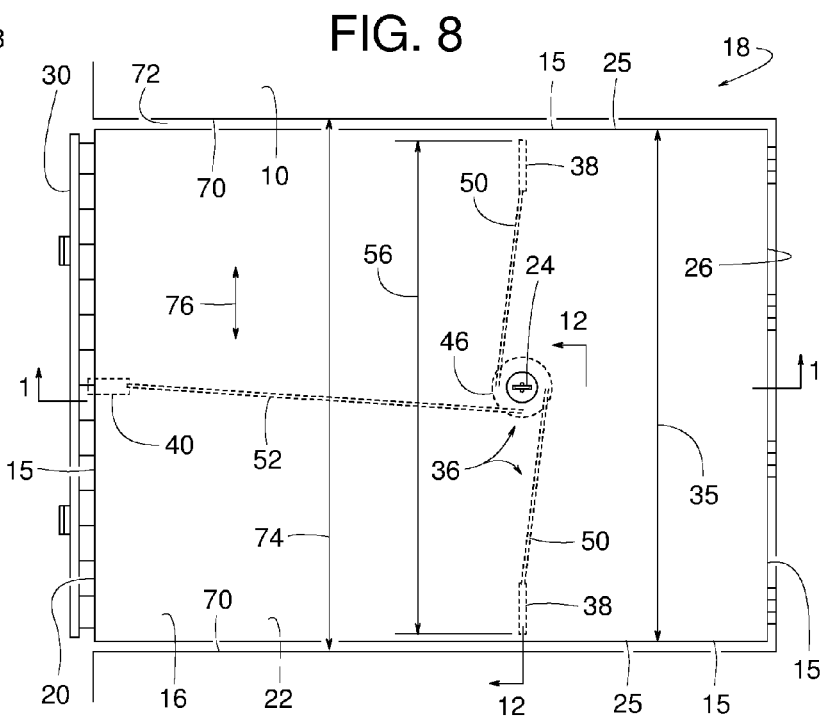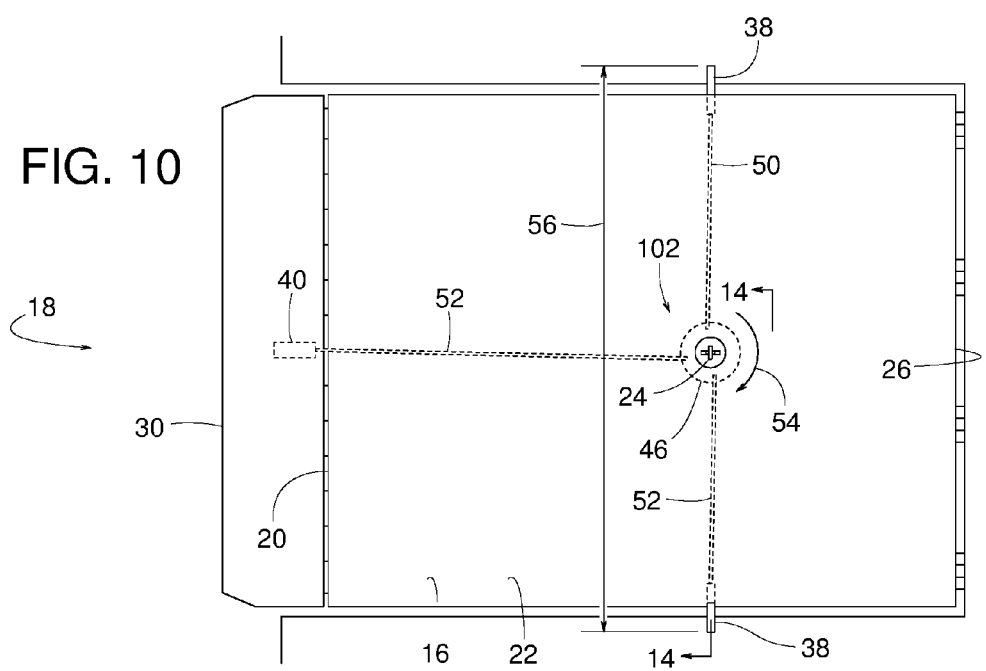

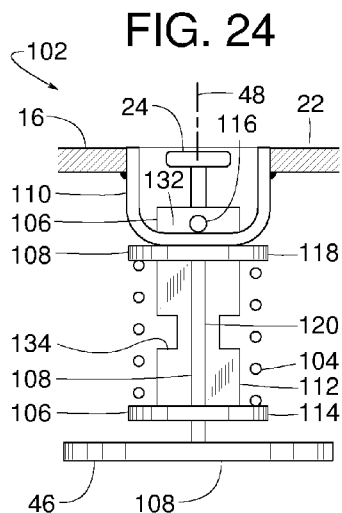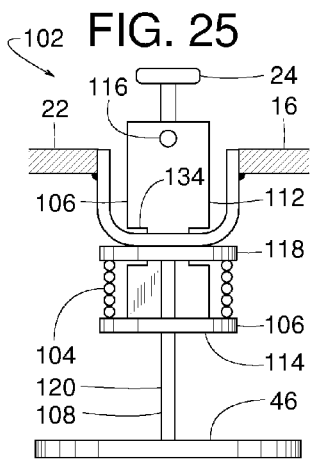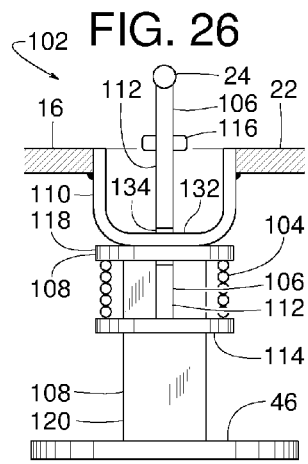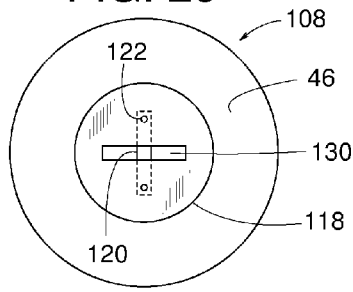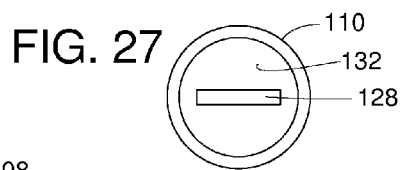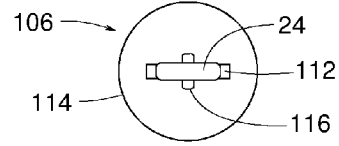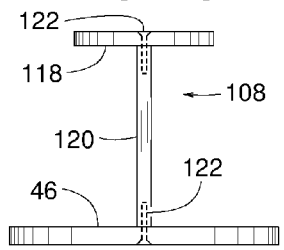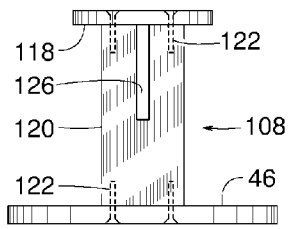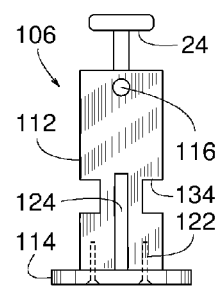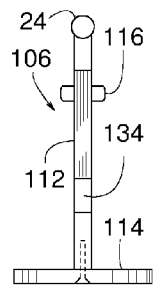

DOCK LEVELER SAFETY SUPPORTS

CROSS REFERENCE TO RELATED APPLICATIONS

This present arises as a continuation of U.S. patent application Ser. No. 14/565,064, filed on Dec. 9, 2014, entitled "Dock Leveler Safety Supports", which is herein incorporated by reference in its entirety.

FIELD OF THE DISCLOSURE

This patent generally pertains to dock levelers and, more specifically, to apparatuses for dock leveler safety supports.

BACKGROUND

A typical loading dock of a building includes an exterior doorway with an elevated platform for loading and unloading vehicles, such as trucks and trailers. To compensate for height differences between the loading dock platform and an adjacent bed of a truck or trailer, many loading docks have a dock leveler. A typical dock leveler includes a deck or ramp that is pivotally hinged along its back edge to vary the height of its front edge. A retractable extension plate or lip pivots or translates outward from the deck's front edge to span the gap between the rear of the truck bed and the front edge of the deck. Thus, the deck and lip provide a bridge between the dock's platform and the vehicle's bed so that personnel and material handling equipment can readily move on and off the vehicle during loading and unloading operations.

Many dock levelers have a pit in which the deck can descend to a cross-traffic position where the upper surface of the deck is generally flush with the platform. Some pits underneath the deck contain power actuators and other mechanisms for operating the dock leveler. To gain access to such mechanisms for maintenance, cleaning or other service operations, it might be necessary to fully raise the deck above the cross-traffic position. For safety, the raised deck should be securely braced before working underneath it. An example for bracing a deck in a raised position is disclosed in U.S. Pat. No. 5,546,623, which is specifically incorporated herein by reference in its entirety.

BRIEF DESCRIPTION OF THE DRAWINGS

FIG. 1 is a cross-sectional side view an example dock leveler constructed in accordance with the teachings disclosed herein taken along line 1-1 of FIG. 8 showing a deck of the example dock leveler in a lowered cross-traffic position.

FIG. 2 is a cross-sectional side view similar to FIG. 1 but showing the example deck in a raised position.

FIG. 3 is a cross-sectional side view similar to FIG. 2 but showing the example deck in a position lower than a position shown in FIG. 1.

FIG. 8 is a top view of the example dock leveler shown in FIG. 1.

FIG. 9 is a front view of the example dock leveler shown in FIG. 8.

FIG. 10 is a top view similar to FIG. 8 but showing the example dock leveler in the service configuration.

FIG. 24 is a side view of an example actuating mechanism constructed in accordance with the teachings disclosed herein.

FIG. 25 is a side view similar to FIG. 24 but showing the example obstruction actuator of FIG. 24 being pulled up prior to it being rotated.

FIG. 26 is a side view similar to FIG. 25 but showing the example obstruction actuator of FIGS. 24 and 25 rotated to place an example dock leveler in a service configuration.

FIG. 27 is a top view of a cup portion of the example actuating mechanism shown in FIGS. 24-26.

FIG. 28 is a front view of a first subassembly of the example actuating mechanism shown in FIGS. 24-26.

FIG. 29 is a top view of FIG. 28.

FIG. 30 is a right side view of FIG. 28.

FIG. 31 is a front view of a second subassembly of the example actuating mechanism shown in FIGS. 24-26.

FIG. 32 is a top view of FIG. 31.

FIG. 33 is a right side view of FIG. 31.

DETAILED DESCRIPTION

Figure 4:
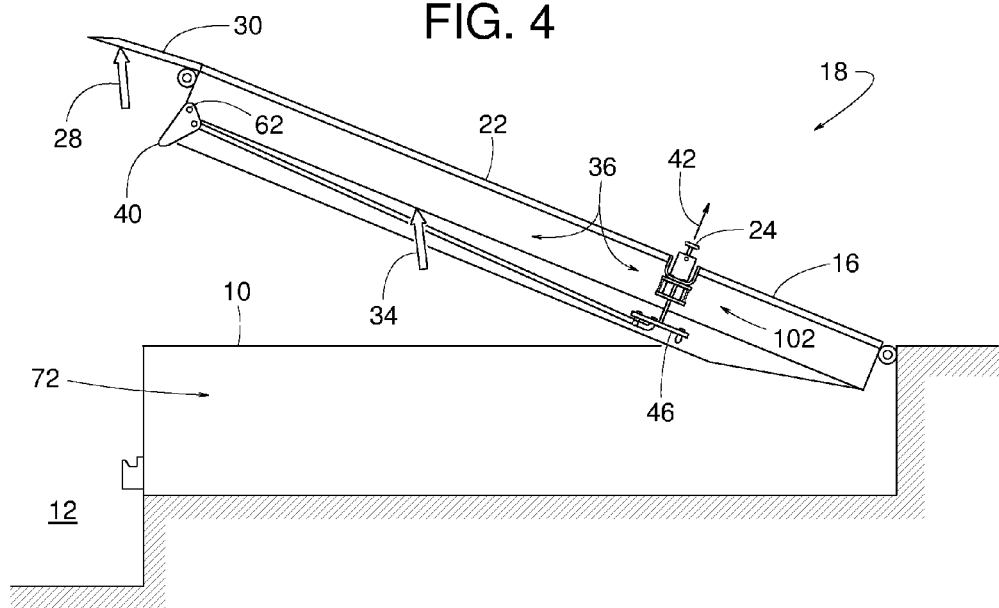
FIG. 4 is a cross-sectional side view similar to FIG. 2 but showing the example dock leveler transitioning to a service configuration.

The example dock leveler safety supports disclosed herein establish a safe working condition in which to maintain, clean and/or otherwise service dock levelers. To maintain, clean and/or otherwise service a pit area underneath the deck of a dock leveler, some example dock levelers disclosed herein include deck obstructions and/or lip obstructions that can be deployed for securing the dock leveler's deck and/or lip in a raised or extended position for the purpose of providing safe access to the underside of the deck. In some examples, the deck and/or lip obstructions disclosed herein may be actuated by manually lifting and/or rotating a handle via an upper surface of the deck. In some examples, the handle may be recessed within the deck (e.g., below a cross-traffic surface of the deck) when the dock leveler is configured in its normal working configuration and protrudes prominently above the deck (e.g., extends above or past the cross-traffic surface of the deck) when the dock leveler is (e.g., locked-out) in a service configuration for maintenance. In some examples, the deck obstructions extend visibly beyond the sides of the deck to provide, for example, further warning and/or a visible warning that the dock leveler is in the service configuration.

FIGS. 1-36 show example dock levelers and their various components constructed in accordance with the teachings disclosed herein. Each of the example dock levelers can be configured selectively in a working configuration (e.g., FIGS. 1-3, 8, 9, 11, 12, 15, 17, 20, 22, 24 and 34) or a service configuration (e.g., FIGS. 6, 7, 10, 13, 14, 16, 18, 21, 23, 26, 35 and 36). The working configuration provides normal operation in transferring cargo between a platform 10 of a loading dock 12 and a vehicle 14 (truck, trailer, etc.) parked at the loading dock 12. During inspection, cleaning, maintenance and/or other service operations, the service configuration prevents movement of a deck 16 of the dock leveler and provides workers with safe access to the underside of the dock leveler's deck 16.

The deck 16 of the illustrated example has an outer perimeter 15 defined by a front edge 20, a rear edge 26, and two lateral edges 25 (FIGS. 8 and 9). The front edge 20 and the rear edge 26 extend in a lateral direction 76 (FIGS. 8 and 9), and the lateral edges 25 are generally parallel to each other and substantially perpendicular to the lateral direction 76. The lateral edges 25 of the example deck 16 define a width 35 of the deck 16.

In some examples, an example dock leveler 18 disclosed herein, when in the working configuration for normal operation, follows the sequence shown in FIGS. 1-3. FIG. 1 shows the vehicle 14 backed up and parked at the loading dock 12 while the front edge 20 of the deck 16 of the dock leveler 18 is at a lowered cross-traffic position with an upward facing side 22 of the deck 16 and the lateral edges 25 being generally flush with the platform 10. FIG. 2 shows a deck actuator 34 raising the deck 16 by pivoting it upward about the deck's rear edge 26, and FIG. 2 further shows a lip actuator 28 extending a lip 30 out from the deck's front edge 20. This allows deck 16 and lip 30 to be subsequently lowered upon a cargo bed 32 of the vehicle 14, as shown in FIG. 3. With lip 30 resting atop the cargo bed 32, the deck 16 and the lip 30 provide a bridge across which cargo can be transferred between vehicle 14 and platform 10 for loading/unloading operations.

The deck actuator 34 is schematically illustrated as an arrow to represent all types of known deck actuators. The term, "deck actuator" refers to any structure capable of forcing or moving a deck up and/or down (e.g., pivoting and/or translating up or down). Examples of a deck actuator include, but are not limited to, a hydraulic cylinder, a pneumatic cylinder, a helical spring, a pneumatic spring, a hydraulic motor, a pneumatic motor, an electric motor (e.g., a linear motor), an inflatable diaphragm, and/or various combinations thereof.

Likewise, the lip actuator 28 is schematically illustrated as an arrow to represent all types of known lip actuators. The term, "lip actuator" refers to any structure capable of extending and/or retracting a lip relative to a deck. The lip's extension or retraction can be by way of pivoting and/or translating. Examples of a lip actuator include, but are not limited to, a hydraulic cylinder, a pneumatic cylinder, a helical spring, a pneumatic spring, a hydraulic motor, a pneumatic motor, an electric motor (e.g., a linear motor), an inflatable diaphragm, and/or various combinations thereof.

Figure 5:
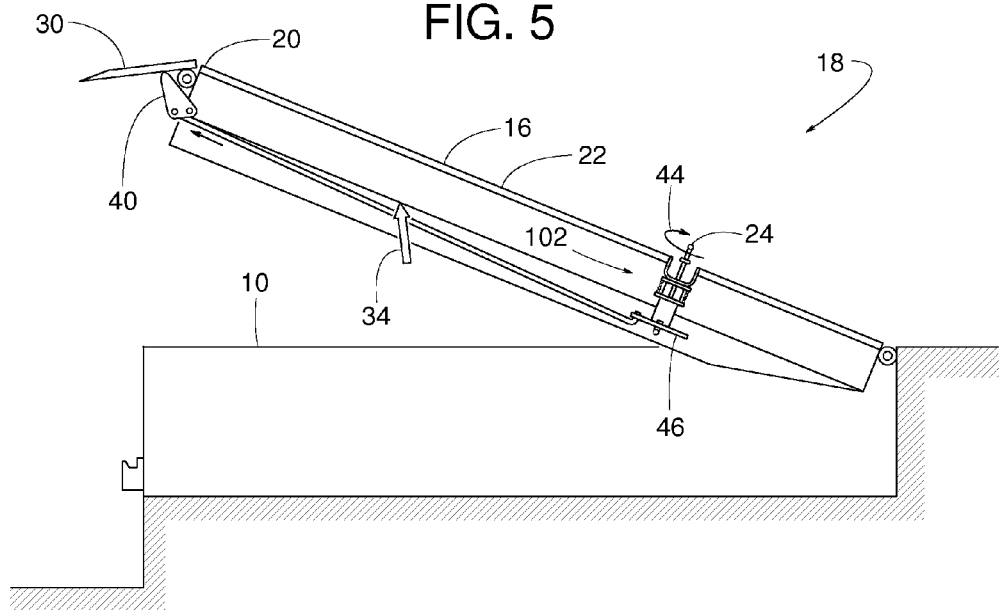
FIG. 5 is a cross-sectional side view similar to FIG. 4 but showing t an obstruction actuator of the example dock leveler being rotated.
Figure 6:
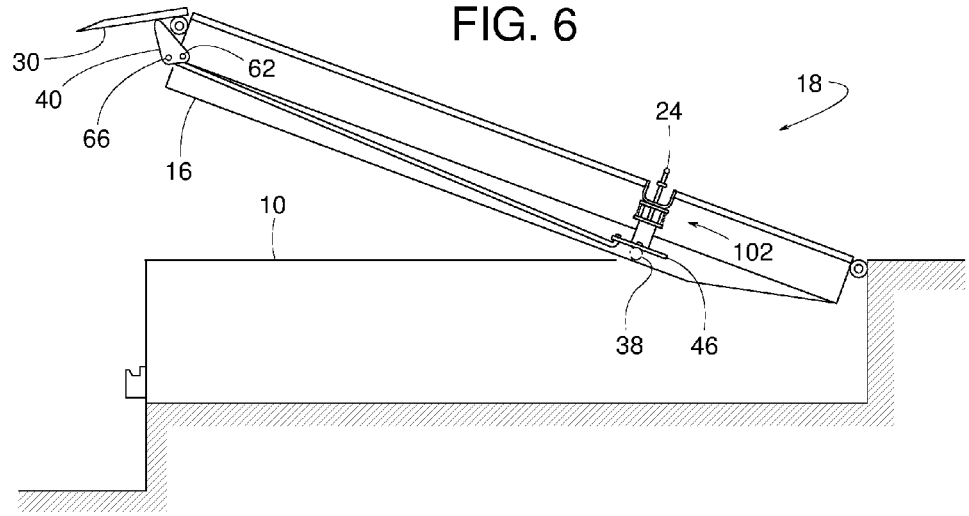
FIG. 6 is a cross-sectional side view similar to FIGS. 1-5 but showing the example dock leveler in the service configuration.
Figure 7:
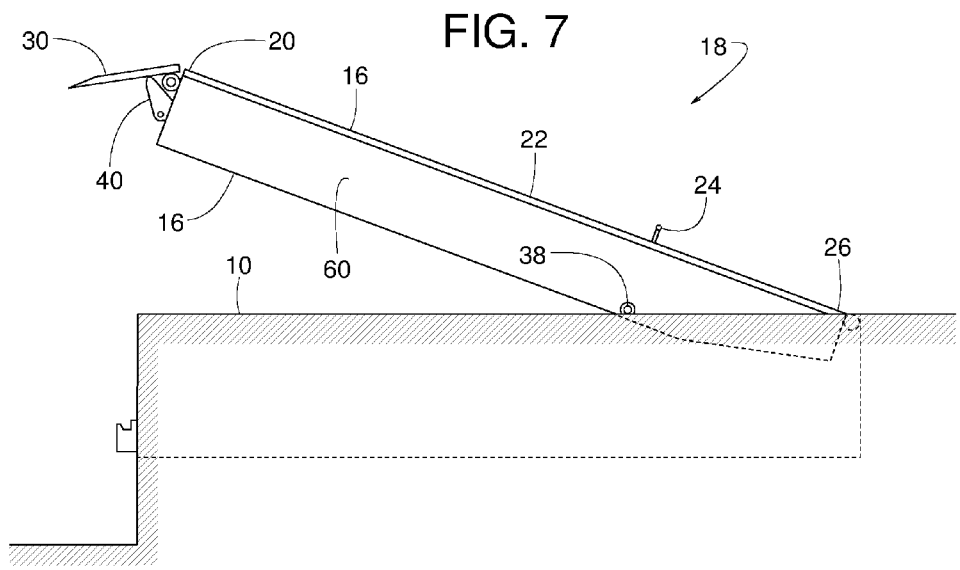
FIG. 7 is a side view showing the example dock leveler in the service configuration.
Figure 11:
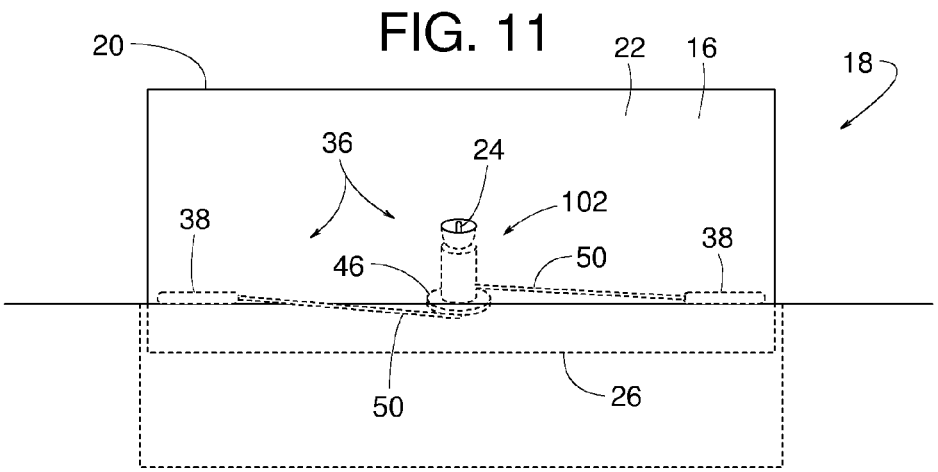
FIG. 11 is a rear view of FIG. 4.
Figure 12:
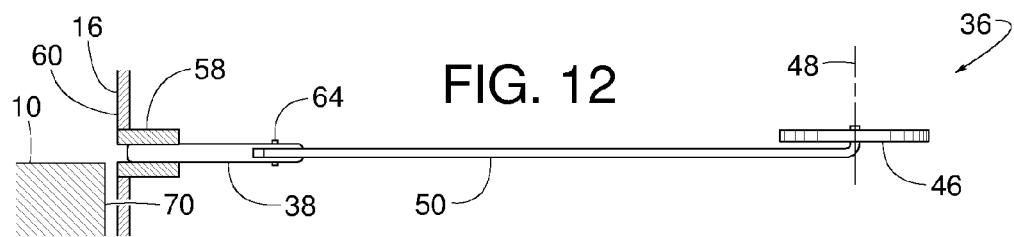
FIG. 12 is a partial cross-sectional view taken along line 12-12 of FIG. 8.
Figure 13:
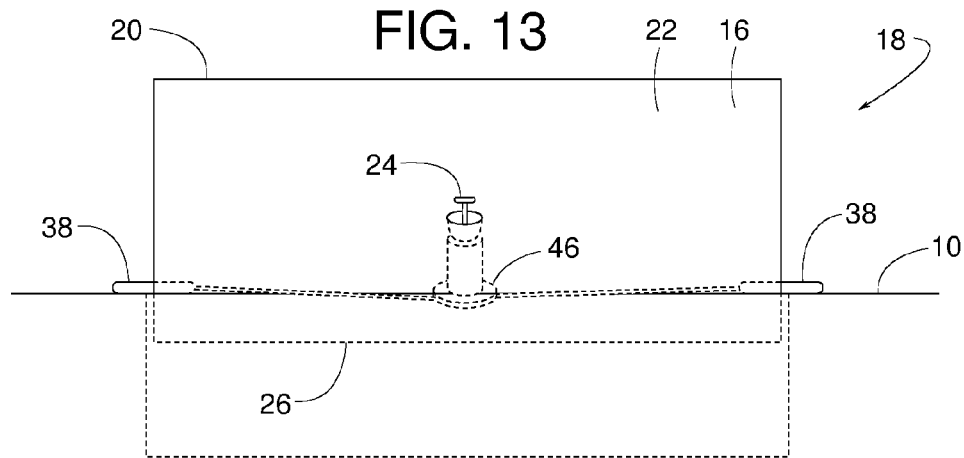
FIG. 13 is a rear view of FIG. 7.
Figure 14:
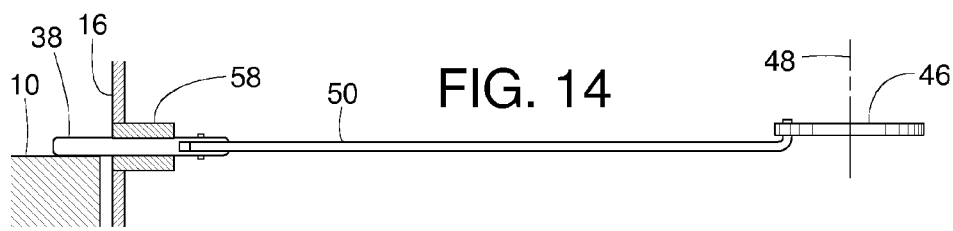
FIG. 14 is a partial cross-sectional view taken along line 14-14 of FIG. 10.

In the service configuration, the dock leveler 18 of the illustrated example is operated in the examples shown in FIGS. 4-7, where FIGS. 6 and 7 are slightly different views of the. FIG. 4 shows the deck actuator 34 raising the deck 16 and the lip actuator 28 extending the lip 30. Next, the deck 16 alone, or in combination with the lip 30, is held in a generally elevated position by a backup support mechanism 36. In the illustrated example, the backup support mechanism 36 includes a deck obstruction 38 (FIG. 7) for supporting the deck 16, a lip obstruction 40 for supporting the lip 30, and an obstruction actuator 24 for extending and retracting the obstructions 38 and 40. When actuated, the backup support mechanism 36 can support both the deck 16 and the lip 30 in the raised or the extended positions without having to rely on the power of the actuators 28 and 34.

After extending the obstructions 38 and 40 by manually moving obstruction actuator 24 as indicated by arrows 42 and 44 (FIGS. 4 and 5), the lip 30 can tilt down and find support against the lip obstruction 40, as shown in FIG. 5, and the deck 16 can descend until the deck obstruction 38 engages platform 10 to support the weight of the deck 16, as shown in FIGS. 6 and 7. Once the deck obstruction 38 supports the deck 16 and the lip obstruction 40 supports the lip 30, as shown in FIGS. 6 and 7, the backup support mechanism 36 maintains the dock leveler 18 in a service configuration while the actuators 28 and 34 can be deactivated.

Various mechanisms can be used for deploying the obstructions 38 and 40. In the example illustrated in FIGS. 1-14, the obstruction actuator 24 is in the form of a manually operated handle that is mechanically coupled to turn a driving member 46 about a first axis 48. Details of mechanically coupling the handle 24 to the driving member 46 will be disclosed below in connection with FIGS. 24-33.

Returning to FIGS. 1-14, in some examples, two connectors 50 connect or couple the driving member 46 to the deck obstructions 38, and a third connector 52 connects the driving member 46 to the lip obstruction 40. In the example illustrated in FIGS. 1-14, the connectors 50 and 52 are rigid rods or bars, each having one end pivotally connected to the driving member 46 and an opposite end coupled to the respective obstruction 38 or 40. The obstruction actuator 24, when rotating the driving member 46 in a first direction 54 (e.g., clockwise 54 in the orientation of FIG. 10) from the position of FIG. 8 to that of FIG. 10, forces the connectors 50 and 52 to move, slide and/or push the obstructions 38 and 40 outward away from the driving member 46. In examples that include the two deck obstructions 38, as shown in FIGS. 8 and 10, the deck obstructions 38 span a deck obstruction distance 56 that is greater when the dock leveler 18 is in the service configuration than when dock leveler 18 is in the working configuration. A sleeve 58 (FIGS. 12 and 14) welded and/or otherwise rigidly attached or coupled to a side plate 60 or other structural member of the deck 16 helps guide the linear movement of the deck obstruction 38. A pin 62 pivotally connects the lip obstruction 40 to the deck 16 to help guide the rotational movement of the lip obstruction 40. Since the connectors 50 and 52 undergo some rotation as the driving member 46 rotates, the pins 64 and 66 pivotally connect the connectors 50 and 52 to their respective obstructions 38 and 40.

Figure 15:
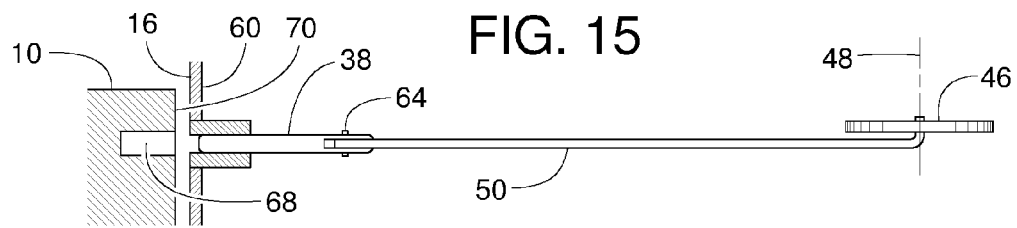
FIG. 15 is a partial cross-sectional view similar to FIG. 12 but showing another example deck obstruction constructed in accordance with the teachings disclosed herein in an unrestrained position.
Figure 16:
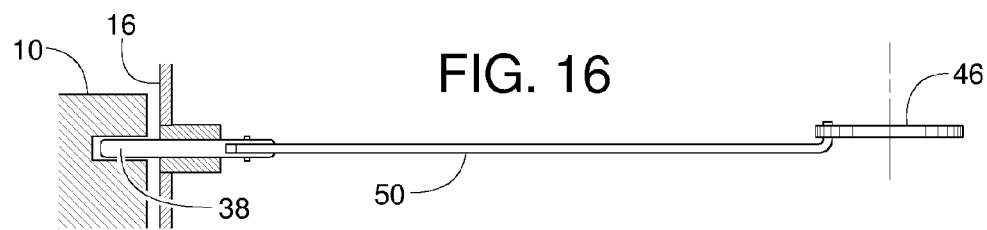
FIG. 16 is a partial cross-sectional view similar to FIG. 15 but showing the example deck obstruction of FIG. 15 in a secured position.

FIGS. 15-23 show other example deck obstructions, lip obstructions and connectors constructed in accordance with the teachings disclosed herein. The example shown in FIGS. 15 and 16 is similar to that shown in FIGS. 1-14. However, instead of the deck obstruction 38 resting atop platform 10 when the deck obstruction 38 is in the secured position, the deck obstruction 38 extends into a cavity 68 (e.g., a hole, slot, etc.) to secure the deck 16, as shown in FIG. 16. In the illustrated example, the cavity 68 is in a side wall 70 of a pit 72 defined by the platform 10. The pit 72 has a pit width 74 (FIGS. 8 and 9) as measured in a lateral direction 76. Referring to FIGS. 15 and 16, retracting the deck obstruction 38 out from within the cavity 68 moves the deck obstruction 38 to an unrestrained position and configures the dock leveler 18 in a working configuration, as shown in FIG. 16.

Figure 17:
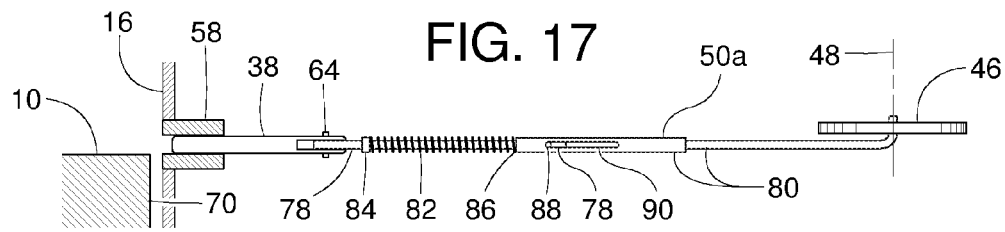
FIG. 17 is a partial cross-sectional view similar to FIG. 12 but showing another example deck obstruction constructed in accordance with the teachings disclosed herein in an unrestrained position.
Figure 18:
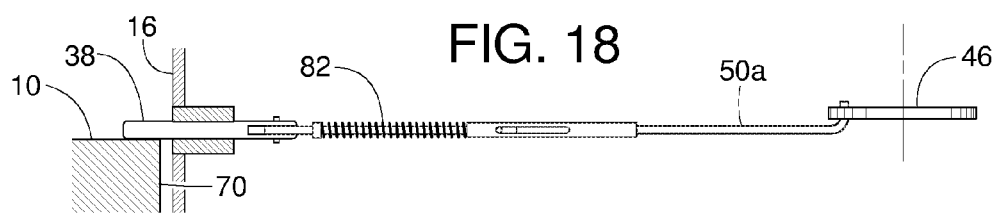
FIG. 18 is a partial cross-sectional view similar to FIG. 17 but showing the example deck obstruction of FIG. 17 in a secured position.
Figure 19:
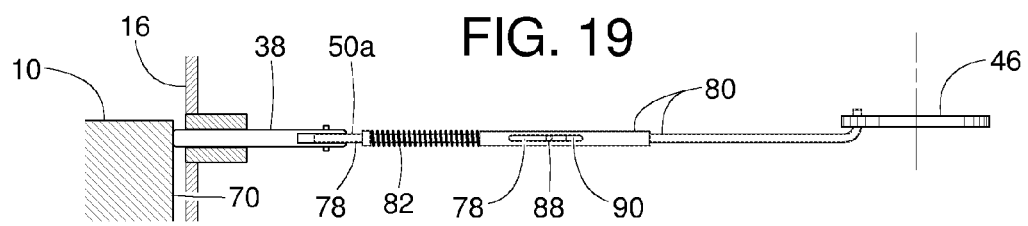
FIG. 19 is a partial cross-sectional view similar to FIG. 18 but showing the example deck obstruction of FIG. 17 being blocked by a side wall of a pit.

FIGS. 17-19 show an example connector 50*a* constructed in accordance with the teachings disclosed herein that is spring-loaded, which allows the connector 50*a* to compress in length when the driving member 46 urges the connector 50*a* to extend while the deck obstruction 38 and/or the lip obstruction is unable to do so because the deck obstruction 38 is neither above the platform 10 nor aligned with the cavity 68, as shown in FIG. 19. The connector 50*a* is shown compressed in FIG. 19, so upon subsequently raising deck 16 to the position shown in FIG. 18, the connector 50*a* will automatically extend the deck obstruction 38 out over the platform 10.

The spring-loaded feature can be particularly useful in certain methods of dock leveler operation. For instance, one example sequence of operation is as follows. First, a dock worker approaches the dock leveler 18 when the deck 16 is in the lowered cross-traffic position, as shown in FIGS. 1, 8 and 9. Second, the worker manually manipulates the obstruction actuator 24 (see arrows 42 and 44 of FIGS. 4 and 5) to extend the deck obstruction 38 to the intermediate position shown in FIG. 19. FIG. 19 shows the spring 82 urging the deck obstruction 38 laterally against the side wall 70 of the pit 72. Third, the worker uses a suitable known dock leveler controller (e.g., a PLC, computer, electromechanical relays, push buttons, etc.) to activate the deck actuator 34 so that deck actuator 34 raises the deck 16 while the spring 82 continues urging the deck obstruction 38 laterally outward. Fourth, when the deck obstruction 38 rises above the platform 10, as shown in FIGS. 7, 18 or higher; the spring 82 moves the deck obstruction 38 laterally outward beyond the side wall 70 (see FIG. 18), as the deck obstruction 38 is no longer obstructed by the side wall 70.

Fifth, with the deck obstruction 38 now extending out over the platform 10, the worker uses the controller to activate the deck actuator 34 in a way that lowers the deck 16 until the deck obstruction 38 is resting upon the platform 10 and supporting at least some of the weight of the deck 16, as shown in FIGS. 7, 10 and 18. At this point in the operation, the dock leveler 18 is in the service configuration.

With deck obstructions or actuating mechanisms that are spring loaded (e.g., FIGS. 17-21, 36 and 37), returning the dock leveler 18 back to the working configuring can be as follows. First, the dock worker approaches the dock leveler 18 while the deck obstructions 38 are supporting at least some of the weight of the deck 16, e.g., FIGS. 7, 10 and 18. Second, the worker manually manipulates the obstruction actuator 24 (e.g., in a direction opposite to that of arrows 42 and 44 in FIGS. 4 and 5) so that the spring 82 urges the deck obstruction 38 to retract. In some examples, however, the spring 82 is unable to retract the deck obstruction 38 due to substantial frictional forces developed by the weight of the deck 16 pressing the deck obstruction 38 down against the platform 10. Consequently, although the spring 82 urges the deck obstruction 38 to retract, the deck obstruction 38 does not retract until the worker uses the controller to activate the deck actuator 34 to raise the deck 16 slightly and thus lift the deck obstruction 38 off of the platform 10. Third, once the deck obstruction 38 lifts off of the platform 10, the spring 82 retracts the deck obstruction 38 laterally inward to the position shown in FIG. 17. Fourth, after the deck obstruction 38 is no longer extending laterally outward beyond the side wall 70 of the pit 72, the worker uses the controller to activate the deck actuator 34 in a way that lowers the deck 16 and lowers the deck obstruction 38 below the platform 10, as shown in FIGS. 8 and 9. At this point, the dock leveler 18 is back to the working configuration.

The actual construction of the example connector 50*a* may vary. In the example illustrated in FIGS. 17-19, the connector 50*a* comprises a rod 78 that fits telescopically within a sleeve and rod member 80. A compression spring 82 is held in compression between a collar 84 on the rod 78 and an axial end 86 of the member 80. A pin 88 extending radially from the rod 78 slides within a slot 90 in the member 80 to limit the axial travel of the rod 78 in the member 80.

Figure 20:
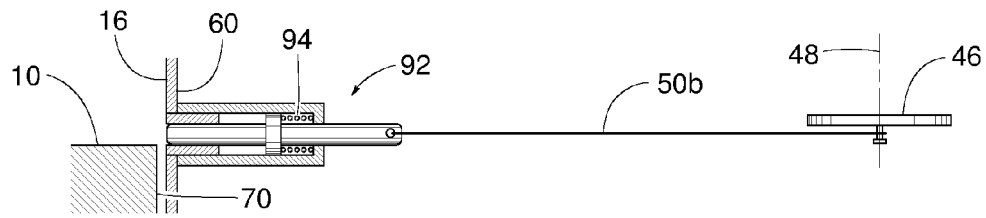
FIG. 20 is a partial cross-sectional view similar to FIG. 12 but showing another example deck obstruction constructed in accordance with the teachings disclosed herein in an unrestrained position.
Figure 21:
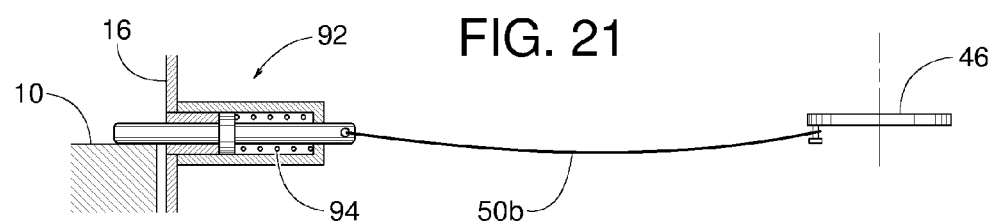
FIG. 21 is a partial cross-sectional view similar to FIG. 20 but showing the example deck obstruction of FIG. 20 in a secured position.

FIGS. 20 and 21 show an example spring-loaded deck obstruction 92 and a connector 50*b* in the form of a compliant elongate member. The term, "compliant elongate member" refers to any element having a length that is at least five times greater than its height and width, where the element when alone and unrestrained is sufficiently flexible to be coiled in at least a single 360-degree loop and subsequently straightened without appreciable permanent deformation (e.g., without plastically deforming the elongate member). Examples of a compliant elongate member include, but are not limited to, a chain, a cable, a cord, a strap, a spring, a wire, a rope, and/or a belt. In this example, a compression spring 94 urges the deck obstruction 92 toward its secured position (FIG. 21). In the unrestrained position (FIG. 20), tension in the connector 50*b* pulls the deck obstruction 92 within the deck 16 and away from the platform 10. In the secured position (FIG. 21), the driving member 46 releases the tension in the connector 50*b*, thereby allowing the spring 94 to move, slide and/or push the deck obstruction 92 out over the platform 10, as shown in FIG. 21.

Figure 22:
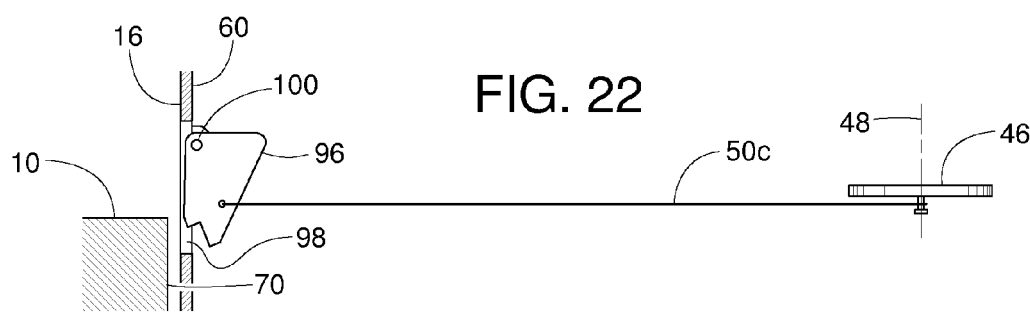
FIG. 22 is a partial cross-sectional view similar to FIG. 12 but showing another example deck obstruction constructed in accordance with the teachings disclosed herein in an unrestrained position.
Figure 23:
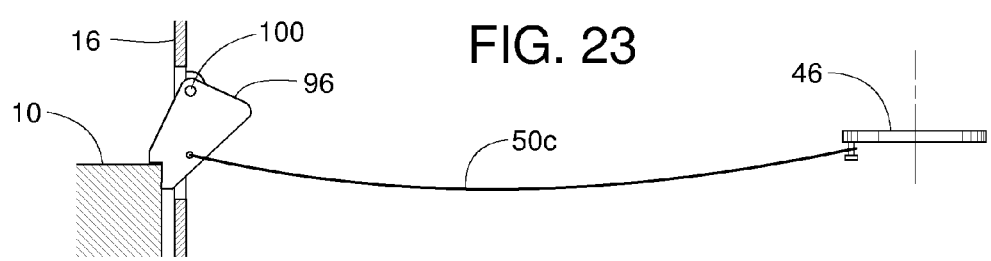
FIG. 23 is a partial cross-sectional view similar to FIG. 22 but showing the example deck obstruction of FIG. 22 in a secured position.

FIGS. 22 and 23 show an example deck obstruction 96 that uses gravity in moving from the unrestrained position (FIG. 22) to the secured position (FIG. 23). The deck obstruction 96 of the illustrated example passes through an opening 98 in the deck 16 by pivoting about a pin 100 attached to the deck 16. A connector 50c in the form of a compliant elongate member attached to the driving member 46 is used for moving, sliding and/or pulling the deck obstruction 96 from the secured position back to the unrestrained position.

Although various mechanisms can be used for moving the deck and lip actuators disclosed herein, FIGS. 24-33 show one example of an actuating mechanism 102 constructed in accordance with the teachings disclosed herein. The actuating mechanism 102 not only provides means for rotating the driving member 46 to move the deck and lip actuators, but the actuating mechanism 102 also ensures that the obstruction actuator 24 (in the form of a manually operated handle) protrudes prominently above the deck's upwardly facing side 22 (e.g., a cross-traffic surface of the deck 16) when the dock leveler 18 is in the service configuration. The obstruction actuator 24 protruding above the deck 16 provides a visible signal to personnel in the area that the dock leveler 18 is in the service configuration. The obstruction actuator 24 being generally flush or recessed below the deck's upwardly facing side 22 (e.g., the cross-traffic surface of the deck 16) indicates that dock leveler 18 is in the working configuration with the deck obstruction 38 being in the unrestrained position and/or the lip obstruction 40 being in the release position.

To deploy the obstructions 38 and 40 as well as provide a prominent visual indication that the dock leveler 18 is in the service configuration, some examples of actuating mechanism 102 include the obstruction actuator 24 (e.g., a handle), the driving member 46, a compression spring 104, a first subassembly 106, a second subassembly 108, and a recessed cup 110 to receive the obstruction actuator 24. The first subassembly 106 of the illustrated example includes the obstruction actuator 24, a first slide plate 112, a lower plate 114, and a stop pin 116. The second subassembly 108 of the illustrated example includes an upper plate 118, a second slide plate 120 and driving member 46. In some examples, screws 122 and/or other suitable fasteners are used in assembling the subassemblies 106 and 108. The screws 122 also enable the two subassemblies 106 and 108 to be interconnected with each other with the spring 104 installed between the upper and lower plates 118 and 114. The outer periphery of the cup 110 is welded to the deck 16 with the base of the cup 110 being interposed between the stop pin 116 and the upper plate 118.

The obstruction actuator 24, the first slide plate 112, the lower plate 114, and the stop pin 116 of the illustrated example rotate about the axis 48 and slide axially as a unit relative to the second subassembly 108. The slots 124 and 126 in the respective slide plates 112 and 120 allow and guide the relative sliding motion of the subassemblies 106 and 108. The spring 104 acting between the upper and lower plates 118 and 114 urges the subassemblies 106 and 108 together in the axial direction, but their relative axial travel is limited regardless of a position the obstruction actuator 24. When the obstruction actuator 24 is in the position shown in FIG. 24 (e.g., the working configuration), the first slide plate 112 is free to slide through a slot 128 in the cup 110 and through a slot 130 in the upper plate 118. However, the stop pin 116 engaging an inside bottom surface 132 of the cup 110 limits the distance in which the spring 104 can move the obstruction actuator 24 down toward the second subassembly 108. In some examples, the stop pin 116 settles within a detent on the cup's bottom surface 132.

When the obstruction actuator 24 is in the position shown in FIG. 26 (e.g., the service configuration), the notches 134 in the first slide plate 112 are at an elevation that provides clearance with the cup 110 and the upper plate 118 so that first slide plate 112 can be rotated 90 degrees from the position shown in FIG. 25 to the position of FIG. 26. Once rotated, as shown in FIG. 26, the upper edges of the notches 134 engage the cup's inside bottom surface 132, thereby limiting the distance in which the spring 104 can move the obstruction actuator 24 back down into the cup 110. Thus the obstruction actuator 24 protrudes above the deck 16 (e.g., above a cross-traffic surface of the deck 16) when the dock leveler 18 is in the service configuration.

In some examples, to change the dock leveler 18 from the working configuration to the service configuration, the obstruction actuator 24 is first manually lifted (e.g., in the direction of arrow 42 in FIG. 4) from the position of FIG. 24 to that of FIG. 25, and then the obstruction actuator 24 is manually rotated (arrow 44 in FIG. 5) between the position of FIG. 25 to that of FIG. 26. The rotation of the obstruction actuator 24 from the position of FIG. 25 to that of FIG. 26 rotates the driving member 46, which moves the deck obstruction 38 from the unrestrained position to the secured position and/or moves the lip obstruction 40 from the release position to the support position, thereby reconfiguring the dock leveler 18 from the working configuration to the service configuration.

Figure 34:
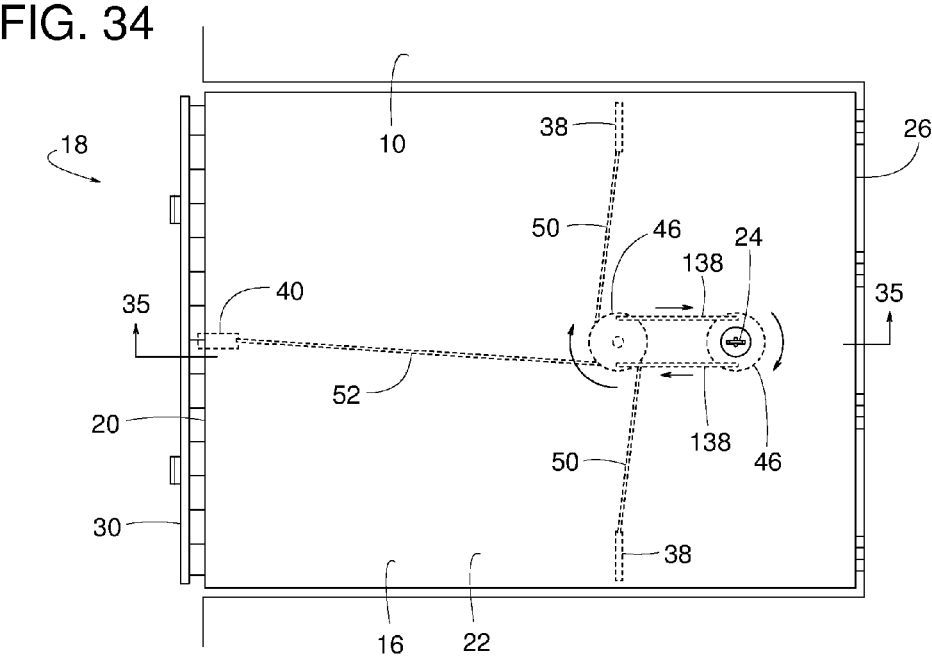
FIG. 34 is a top view similar to FIG. 8 but showing another example dock leveler constructed in accordance with the teachings disclosed herein.
Figure 35:
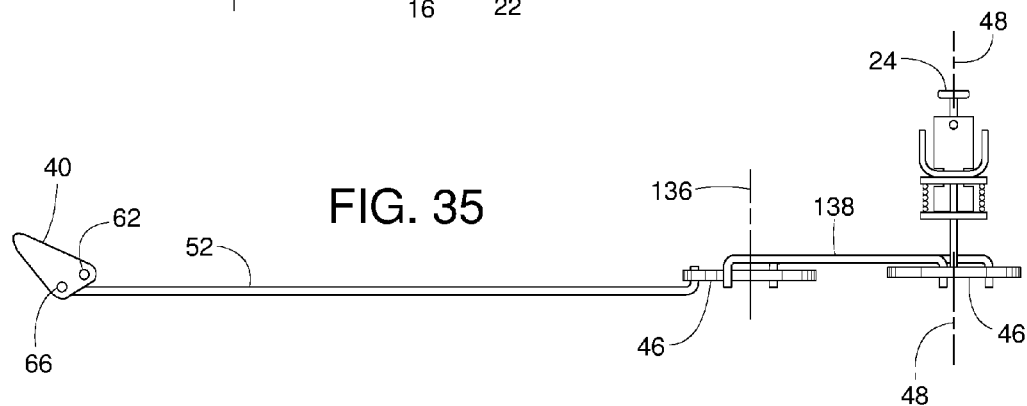
FIG. 35 is a cross-sectional view taken along line 35-35 of FIG. 34 but without showing the dock leveler's deck and lip.

In some examples it might be beneficial to have the obstruction actuator 24 closer to the deck's rear edge 26 and have a driving member 46 farther or spaced away from the driving member 46 adjacent the handle 24, as shown in FIGS. 34 and 35. The obstruction actuator 24 might be more accessible to dock workers on the platform 10 if the obstruction actuator 24 is closer to the deck's rear edge 26. Having a driving member 46 and the associated the deck obstruction 38 farther or spaced away from the deck's rear edge 26 places the deck obstruction 38 at a more mechanically advanced position that reduces the vertical load and/or shear strain on the deck obstruction 38 when the deck obstruction 38 is in the service condition. Also, the deck obstruction 38 being farther forward (e.g., away from the rear edge 26) provides the deck obstruction 38 with more mounting location options because the more forward the deck obstruction 38 is, the more of the deck 16 is exposed above the platform 10.

Therefore, in some examples, the obstruction actuator 24 and the driving member 46 are installed to rotate about a first axis 48, and a second driving member 46 operatively coupled to the deck obstruction 38 (and/or lip obstruction 40) is installed to rotate about a second axis 136 that is radially and/or laterally offset to first axis 48. In the illustrated example, the second axis 136 is parallel relative to the first axis 48. However, in other examples, the second axis 136 may be non-parallel relative to the first axis 48. A mechanical coupling 138 (e.g., linkage system, drive chain, cogged belt, etc.) couples the first driving member 46 and the second driving member 46 so that one driving member rotates the other (e.g., simultaneously).

Figure 36:
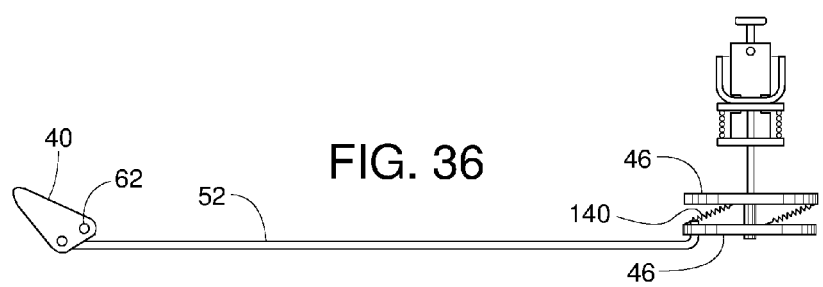
FIG. 36 is a cross-sectional view similar to FIG. 35 but showing another example actuating mechanism constructed in accordance with the teachings disclosed herein.

In addition or as an alternative to the spring-loaded features shown in FIGS. 17-21, some example actuating mechanisms disclosed herein include one or more springs 140 that couple and provide spring-loaded rotational slip between the first and second driving members 46, as shown in FIG. 36. If the pit's side wall 70 or something else blocks the extension of the deck obstruction 38 and/or the lip obstruction 40, the spring 140 allows the obstructions 38 and/or 40 to hold the lower driving member 46 stationary even though the upper driving member 46 rotates (e.g., about the axis 48). If the deck obstruction 38 and the lip obstruction 40 are free to extend, the spring 140 transmits the rotational torque from the first upper driving member 46 to the second lower driving member 46 so that the first driving member 46 rotates the second driving member 46. Thus the obstructions 38 and 40 freely extend. In some examples, one or more tabs or studs extending axially between the first and second driving members 46 engage each other to limit the relative rotational slip between the first and second driving members 46.

In some examples, to more clearly indicate when the dock leveler 18 is in the service configuration, the dock leveler 18 includes a light that is controlled to illuminate the obstruction actuator 24 when the obstruction actuator 24 is protruding above the deck 16. Thus, some examples of the obstruction actuator 24 are illuminated more when the dock leveler 18 is in the service configuration than when the dock leveler 18 is in the working configuration. Such a light can be installed in various locations, examples of which include, but are not limited to, embedded within or attached to the obstruction actuator 24, installed within the cup 110, and/or installed underneath the deck 16 and projecting light upward toward the obstruction actuator 24. In some examples, the light flashes so it is more noticeable.

Figure 37:
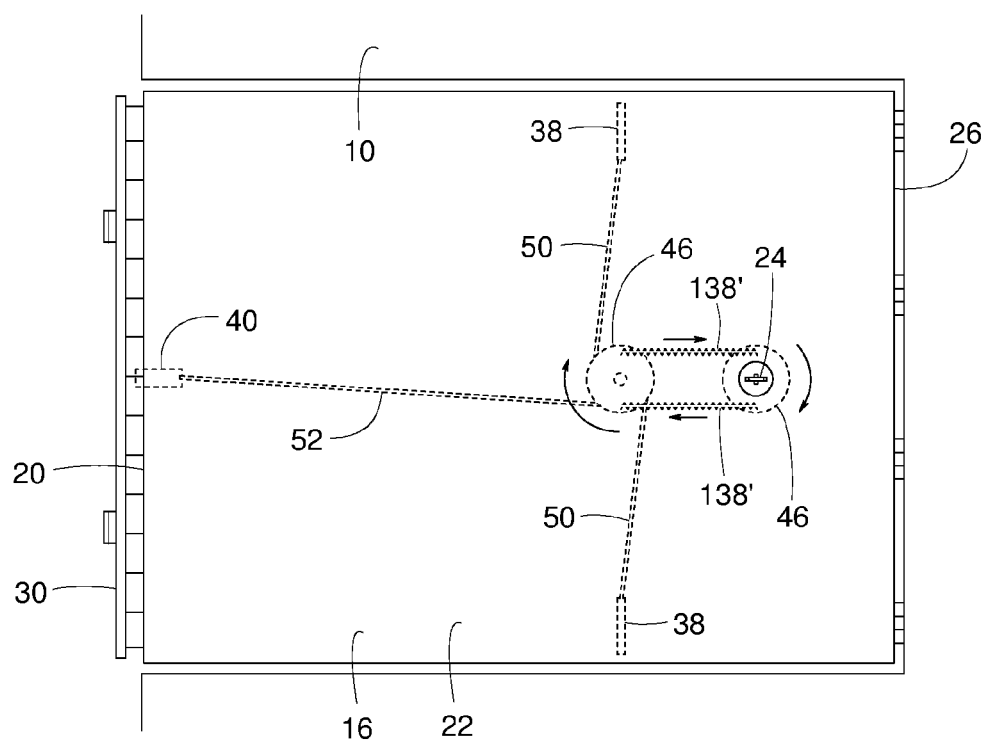
FIG. 37 is a top view similar to FIG. 34 but showing another example mechanical coupling constructed in accordance with the teachings disclosed herein.

For clarity, it should be noted that the term, "proximate" means within approximately six inches. The term, "obstruction" refers to any member that physically blocks the movement of another member. The obstruction actuator being manually accessible from above the deck means that a person while standing on the deck's upwardly facing side 22 (e.g., a cross-traffic surface) can manually and fully operate the obstruction actuator by hand. The term, "upwardly facing side" or "cross-traffic surface" refers to the surface upon which material handling equipment and other traffic normally travel. Also, of the various example dock leveler component parts and features, such parts and features are interchangeable such that parts and features of one disclosed example can be added or substituted for parts and features of another example dock leveler. In some examples, the lip actuator 28 (FIG. 4) and the lip obstruction 40 share one or more of the same components. For instance, in some examples, the lip obstruction 40 is used for extending and retracting lip 30 when the dock leveler 18 is in the working configuration during normal operation. In some examples, the mechanical coupling 138, of FIG. 35, includes a spring-loaded feature to provide the connection between the driving members 46 with resilient slip that accommodates the obstructions 38 and/or 40 becoming blocked in manners similar to those described with reference to FIGS. 17-19 and 36. FIG. 37, for example, shows a mechanical coupling 138' in the form of a tension spring.

While some example dock levelers have just one deck obstruction 38, other example dock levelers disclosed herein have two or more deck obstructions 38 to provide the deck 16 with more balanced support. Although some example deck obstructions or lip obstructions are actuated manually by lifting and turning a handle, other example deck obstructions or lip obstructions disclosed herein are power operated via, for example, a actuator. Examples of powered actuators include, but are not limited to, a hydraulic cylinder, a pneumatic cylinder, a hydraulic motor, a pneumatic motor, an electric motor (e.g., a linear motor), an inflatable diaphragm, and/or various combinations thereof.

Some example dock levelers include a padlock or other type of lock that prevents unauthorized individuals from moving the obstruction actuator 24 in a way that would shift and/or move the dock leveler 18 back to its working configuration. There are various examples of such lockout means, and some examples of them include, but are not limited to, a removable padlock on the deck obstruction 38, other types of locks on the deck obstruction 38, a locking device or mechanism (e.g., a padlock) that selectively permits or prevents the rotation of the driving member 46, a locking device or mechanism that selectively permits or prevents the movement of the connector 50, a locking device or mechanism that selectively permits or prevents the movement of the obstruction actuator 24, and a locking device or mechanism that selectively permits or prevents the movement of the actuating mechanism 102, etc.

At least some of the aforementioned examples include one or more features and/or benefits including, but not limited to, the following:

In some examples, an example dock leveler disclosed herein is installable at a loading dock having a platform, the platform defining a pit having a pit width as measured in a lateral direction, the dock leveler having a deck having an outer perimeter defined by a front edge, a rear edge, a first lateral edge and a second lateral edge, the rear edge being proximate the platform and the front edge being movable relative to the platform between a raised position and a lowered cross-traffic position when the dock leveler is in a working configuration, the first lateral edge and the second lateral edge being proximate the platform when the deck is in the lowered cross-traffic position, the deck residing at least partially in the pit when the front edge of the deck is in the lowered cross-traffic position, the front edge being above at least one of the lowered cross-traffic position or the raised position and inhibited from descending toward the lowered cross-traffic position when the dock leveler is in a service configuration. The dock leveler, in some examples having a first deck obstruction movable relative to the deck between a secured position and an unrestrained position, the first deck obstruction in the secured position configures the dock leveler in the service configuration and the first deck obstruction in the unrestrained position configures the dock leveler in the working configuration, where the first deck obstruction extends farther beyond the outer perimeter of the deck when the first deck obstruction is in the secured position than when the first deck obstruction is in the unrestrained position, and an obstruction actuator operatively coupled to the first deck obstruction to move the first deck obstruction between the secured position and the unrestrained position.

In some examples, a first deck obstruction protrudes above a surface of a platform when the first deck obstruction is in the secured position.

In some examples, a first deck obstruction includes an elongate bar that extends greater horizontally than vertically.

In some examples, a compliant elongate member coupled to the first deck obstruction.

In some examples, a spring is coupled to the first deck obstruction.

In some examples, a first deck obstruction and a second deck obstruction protrude away from each other to span an overall deck obstruction distance that varies depending on whether the dock leveler is in a working configuration or in a service configuration, where the overall deck obstruction distance is greater than the pit width when the dock leveler is in the service configuration, and the overall deck obstruction distance is less than the pit width when the dock leveler is in the working configuration.

In some examples, an obstruction actuator is accessible from above the deck.

In some examples, a dock leveler is installable at a loading dock having a platform, the dock leveler having a deck, a deck actuator, a first deck obstruction, and an obstruction actuator.

In some examples, the deck has a front edge, a rear edge proximate the platform, a first lateral edge extending between the front edge and the rear edge, and a second lateral edge extending between the front edge and the rear edge, where the front edge is movable relative to the platform selectively between a raised position and a lowered cross-traffic position when the dock leveler is in a working configuration, and where the first lateral edge and the second lateral edge are proximate the platform when the deck is in the lowered cross-traffic position and the front edge is positioned above the lowered cross-traffic position and inhibited from descending toward the lowered cross-traffic position when the dock leveler is in a service configuration. In some such examples, a deck actuator is configured to move the front edge of the deck between the raised position and the lowered cross-traffic position when the dock leveler is in the working configuration. In some such examples, a lip is proximate the front edge of the deck and is movable relative to the deck selectively between an extended position and a retracted position while the dock leveler is in the working configuration. In some such examples, a first deck obstruction is movable relative to the deck actuator and the first deck obstruction is movable relative to the deck between the secured position and the unrestrained position, where the first deck obstruction in the secured position configures the dock leveler in the service configuration and the first deck obstruction in the unrestrained position configures the dock leveler in the working configuration. In some such examples, the first deck obstruction in the secured position is to physically block downward movement of a deck toward a lowered cross-traffic position, where the first deck obstruction in the unrestrained position permits downward movement of the deck toward the lowered cross-traffic position. In some examples, an obstruction actuator is operatively coupled to the first deck obstruction to move the first deck obstruction between the secured position and the unrestrained position, where the obstruction actuator is accessible from an upper surface of the deck.

In some examples, a lip obstruction is selectively movable relative to a first deck obstruction between a support position and a release position, where the lip obstruction in the support position prevents the lip from moving to the retracted position and the lip obstruction in the release position permits the lip to move to the retracted position. In some such examples, the obstruction actuator is operatively coupled to the lip obstruction to move the lip obstruction between the support position and the release position.

In some examples, the obstruction actuator is a manually operated handle assessable via the upper surface of the deck.

In some examples, a manually operated handle protrudes above the upper surface of the deck when the dock leveler is in the service configuration and the manually operated handle is retracted or recessed below the upper surface of the deck when the dock leveler is in the working configuration.

In some examples, an obstruction actuator is more illuminated when the dock leveler is in the service configuration than when the dock leveler is in the working configuration.

In some examples, a platform defines a pit in which the deck resides when the front edge of the deck is in the lowered cross-traffic position when the deck is in the working configuration, the first deck obstruction to protrude horizontally beyond a perimeter of the pit defined inner surfaces of walls defining the pit when the first deck obstruction is in the secured position, and the first deck obstruction is retracted within the inner perimeter defined by the walls of the pit when the first deck obstruction is in the unrestrained position.

In some examples, the first deck obstruction protrudes out over the platform when the dock leveler is in the service configuration.

In some examples, the first deck obstruction includes an elongate bar coupled to the obstruction actuator.

In some examples, a compliant elongate member is coupled between the obstruction actuator and the first deck obstruction.

In some examples, the pit has a pit width as measured in a direction generally parallel to the rear edge of the deck, and the dock leveler further comprises a second deck obstruction, the first deck obstruction and the second deck obstruction protruding away from each other to span an overall deck obstruction distance that varies depending on whether the dock leveler is in the working configuration or in the service configuration, the overall deck obstruction distance being greater than the pit width when the dock leveler is in the service configuration, and the overall deck obstruction distance being less than the pit width when the dock leveler is in the working configuration.

In some examples, a spring is coupled to the first deck obstruction, where the spring urges the first deck obstruction toward the secured position.

In some examples, the first deck obstruction is urged toward the secured position by gravitational force.

In some examples, an actuator mechanism includes the obstruction actuator, a first driving member, and a second driving member, where the obstruction actuator is configured to rotate the first driving member, the first driving member is configured to rotate the second driving member, and the second driving member is configured to move the first deck obstruction between the secured position and the unrestrained position. In some such examples, a first axis about which the obstruction actuator and the first driving member rotate and a second axis about which the second driving member rotates are offset.

In some examples, a dock leveler installable at a loading dock having a platform includes a deck movable relative to a platform between a raised position and a lowered cross-traffic position when the dock leveler is in a working configuration, where the deck is held above at least one of the lowered cross-traffic position or the raised position and inhibited from descending toward the lowered cross-traffic position when the dock leveler is in the service configuration. In some such examples, a first deck obstruction is movable relative to the deck between a secured position and an unrestrained position, where the first deck obstruction in the secured position configures the dock leveler in the service configuration and the first deck obstruction in the unrestrained position configures the dock leveler in the working configuration, and where the first deck obstruction in the secured position blocks movement of the deck toward the lowered cross-traffic position and the first deck obstruction in the unrestrained position permits movement of the deck toward the lowered cross-traffic position. In some such examples, a handle is operatively coupled to the first deck obstruction to move the first deck obstruction between the secured position and the unrestrained position, the handle is recessed relative to a cross-traffic surface of the deck when the dock leveler is in the working configuration, and the handle protrudes above the cross-traffic surface of the deck when the dock leveler is in the service configuration.

In some examples, a lip is proximate a front edge of the deck and is movable relative to the deck between an extended position and a retracted position when the dock leveler is in the working configuration. In some such examples, a lip obstruction is movable relative to the first deck obstruction between a support position and a release position, where the lip obstruction in the support position prevents the lip from moving to the retracted position and the lip obstruction in the release position permits movement of the lip toward the retracted position, and the handle is operatively coupled to the lip obstruction to move the lip obstruction between the support position and the release position.

In some examples, the handle is more illuminated when the dock leveler is in the service configuration than when the dock leveler is in the working configuration.

In some examples, the platform defines a pit in which the deck resides when the deck is in the lowered cross-traffic position, where the first deck obstruction protrudes horizontally beyond the pit when the first deck obstruction is in the secured position and the first deck obstruction retracts within the pit when the first deck obstruction is in the unrestrained position.

In some examples, the first deck obstruction protrudes out over the platform when the dock leveler is in the service configuration.

In some examples, the first deck obstruction engages a surface of the platform when the dock leveler is in the service configuration.

In some examples, a pit has a pit width as measured in a direction generally parallel to a rear edge of the deck opposite a front edge of the deck, where the dock leveler further includes a second deck obstruction, the first deck obstruction and the second deck obstruction to protrude away from each other to span an overall deck obstruction distance that varies depending on whether the dock leveler is in the working configuration or in the service configuration, the overall deck obstruction distance being greater than the pit width when the dock leveler is in the service configuration and the overall deck obstruction distance being less than the pit width when the dock leveler is in the working configuration.

In some examples, an actuator mechanism includes the handle, a first driving member and a second driving member, the handle is configured to rotate the first driving member, the first driving member is configured to rotate the second driving member, and the second driving member is configured to move the first deck obstruction between the secured position and the unrestrained position, where a first axis about which the handle and the first driving member rotate is offset relative to a second axis about which the second driving member rotates.

In some examples, a dock leveler method for operating a dock leveler having at least one of a deck installed within a pit and the pit being defined by a platform that faces upward and a side wall that faces in a lateral direction, the dock leveler method including urging, via a spring, the deck obstruction laterally against the side wall of the pit; raising the deck while the spring urges the deck obstruction laterally against the side wall of the pit; moving the deck obstruction above the platform via the deck; in response to the deck obstruction rising above the platform, the moving, via the spring, the deck obstruction laterally outward beyond the side wall of the pit; after the deck obstruction protrudes laterally outward beyond the side wall of the pit, descending the deck and thereby lowering the deck obstruction onto the platform; and supporting at least a portion of the deck's weight via engagement between the deck obstruction and the platform.

In some examples, a method includes supporting the obstruction actuator via the deck; and manually manipulating the obstruction actuator, wherein the spring urging the deck obstruction laterally against the side wall of the pit is performed in response to manually manipulating the obstruction actuator.

In some examples, a method includes after the deck obstruction is supporting at least a portion of the deck's weight, raising the deck to lift the deck obstruction off the platform; in response to raising the deck to lift the deck obstruction off a surface of the platform, moving, via the spring, the deck obstruction laterally inward such that the deck obstruction no longer extends laterally outward beyond the side wall of the pit; and after the deck obstruction is no longer extending laterally outward beyond the side wall of the pit, descending the deck and thereby lowering the deck obstruction below the surface of the platform.

In some examples, a method includes supporting the obstruction actuator via the deck; and manually manipulating the obstruction actuator, wherein the spring moving the deck obstruction laterally inward is performed as a result of both manually manipulating the obstruction actuator and raising the deck to lift the deck obstruction off the surface of the platform.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A dock leveler apparatus installable at a loading dock having a platform, the dock leveler apparatus comprising:
    a deck movable relative to a platform between a raised position and a lowered cross-traffic position when the dock leveler is in a working configuration, the deck to be inhibited from descending toward the lowered cross-traffic position when the dock leveler is in a service configuration;
    a first deck obstruction being movable relative to the deck between a secured position and an unrestrained position, the first deck obstruction in the secured position configures the dock leveler in the service configuration, the first deck obstruction in the unrestrained position configures the dock leveler in the working configuration, the first deck obstruction in the secured position to block movement of the deck toward the lowered cross-traffic position, the first deck obstruction in the unrestrained position to permit movement of the deck toward the lowered cross-traffic position; and
    a first connector to couple the first deck obstruction to an obstruction actuator, the first connector including:
        a rod;
        a sleeve to telescopically receive the rod; and
        a spring held in compression between the rod and the sleeve.

2. The apparatus of claim 1, wherein the rod further includes a pin extending radially from the rod that is to slide within a slot formed in the sleeve to limit axial travel of the rod relative to the sleeve.

3. The apparatus of claim 1, wherein the deck includes a lip proximate a front edge of the deck and being movable relative to the deck between an extended position and a retracted position when the dock leveler is in the working configuration.

4. The apparatus of claim 3, further including a lip obstruction being movable relative to the first deck obstruction between a support position and a release position, the lip obstruction in the support position to prevent the lip from moving to the retracted position, the lip obstruction in the release position to permit movement of the lip toward the retracted position.

5. The dock leveler of claim 4, further comprising a handle operatively coupled to the first deck obstruction and the lip obstruction, the handle to move the first deck obstruction between the secured position and the unrestrained position and move the lip obstruction between the support position and the release position, the handle being recessed relative to a cross-traffic surface of the deck when the dock leveler is in the working configuration, and the handle to protrude above the cross-traffic surface of the deck when the dock leveler is in the service configuration.

6. The dock leveler of claim 5, further comprising an actuator mechanism that includes the handle, a first driving member, the handle being configured to rotate the first driving member to move the first deck obstruction between the secured position and the unrestrained position and the lip obstruction between the support position and the release position.

7. The dock leveler of claim 1, wherein the platform defines a pit in which the deck resides when the deck is in the lowered cross-traffic position, the first deck obstruction to protrude horizontally beyond the pit when the first deck obstruction is in the secured position, and the first deck obstruction to be retracted within a perimeter the pit when the first deck obstruction is in the unrestrained position.

8. The dock leveler of claim 1, wherein the first deck obstruction protrudes out over the platform when the dock leveler is in the service configuration.

9. The dock leveler of claim 1, wherein the platform defines a pit, the pit having a pit width as measured in a direction generally parallel to a rear edge of the deck opposite a front edge of the deck, the dock leveler further comprises a second deck obstruction, the first deck obstruction and the second deck obstruction to protrude away from each other to span an overall deck obstruction distance that varies depending on whether the dock leveler is in the working configuration or in the service configuration, the overall deck obstruction distance being greater than the pit width when the dock leveler is in the service configuration and the overall deck obstruction distance being less than the pit width when the dock leveler is in the working configuration.

10. A method for operating a dock leveler, the dock leveler having a deck installed within a pit defined by a platform that faces upward and a side wall that faces in a lateral direction, the method comprising:
   moving an obstruction actuator between a stored position and a activated position to cause a deck obstruction to move between a retracted position and an extended position;
   urging, via a spring, a deck obstruction laterally against the side wall of the pit, wherein the spring urging the deck obstruction laterally against the side wall of the pit is performed in response to manually manipulating the obstruction actuator;
   raising the deck while the spring urges the deck obstruction laterally against the side wall of the pit and the actuator is in the activated position;
   moving the deck obstruction above the platform via the deck;
   moving, via the spring and in response to the deck obstruction rising above the platform, the deck obstruction laterally outward beyond the side wall of the pit;
   descending the deck and thereby lowering the deck obstruction onto the platform; and
   supporting at least a portion of a weight of the deck via engagement between the deck obstruction and the platform.

11. The method of claim 10, further including supporting the obstruction actuator via the deck.

12. The method of claim 10, further comprising:
   after the deck obstruction is supporting at least a portion of the weight of the deck, raising the deck to lift the deck obstruction off the platform;
   moving, via the spring and in response to raising the deck to lift the deck obstruction off a surface of the platform, the deck obstruction laterally inward such that the deck obstruction no longer extends laterally outward beyond the side wall of the pit; and
   descending the deck and thereby lowering the deck obstruction below the surface of the platform.

13. The method of claim 12, further comprising:
   supporting the obstruction actuator via the deck; and
   manually manipulating the obstruction actuator, wherein the spring moving the deck obstruction laterally inward is performed as a result of both manually manipulating the obstruction actuator and raising the deck to lift the deck obstruction off the surface of the platform.

14. A dock leveler apparatus comprising:
   a deck having an outer perimeter defined by a front edge, a rear edge, a first lateral edge and a second lateral edge, the rear edge being proximate a platform and the front edge being movable relative to the platform between a raised position and a lowered cross-traffic position when the dock leveler is in a working configuration, the first lateral edge and the second lateral edge being proximate the platform when the deck is in the lowered cross-traffic position, the deck residing at least partially in a pit when the front edge of the deck is in the lowered cross-traffic position, the front edge being inhibited from descending toward the lowered cross-traffic position when the dock leveler is in a service configuration, the deck includes a lip proximate a front edge of the deck and being movable relative to the deck between an extended position and a retracted position when the dock leveler is in the working configuration;
   the deck obstruction in the secured position is to extend beyond the outer perimeter of the deck and the deck obstruction in the unrestrained position is to be positioned within the outer perimeter of the deck,
   a deck obstruction movable relative to the deck between a secured position and an unrestrained position, the deck obstruction in the secured position configures the dock leveler in the service configuration, the deck obstruction in the unrestrained position configures the dock leveler in the working configuration;
   a lip obstruction being movable relative to the deck obstruction between a support position and a release position, the lip obstruction in the support position to prevent the lip from moving to the retracted position, the lip obstruction in the release position to permit movement of the lip toward the retracted position; and
   an actuator operatively coupled to the deck obstruction and the lip obstruction, the actuator to move the deck obstruction between the secured position and the unrestrained position and the actuator to move the lip obstruction between the support position and the release position.

15. The apparatus of claim 14, wherein the deck obstruction is to extend farther beyond an outer perimeter of the deck when the deck obstruction is in the secured position than when the deck obstruction is in the unrestrained position.

16. The apparatus of claim 14, wherein the actuator includes a drive member, the drive member being coupled to the deck obstruction via a first connector and coupled to the lip obstruction via a second connector.

17. The apparatus of claim 16, wherein the drive member is rotatable about an axis that is substantially perpendicular to a traffic surface of the deck.

18. The apparatus of claim 16, wherein at least one of the first connector or the second connector includes a rigid bar.

19. The apparatus of claim 16, wherein the first connector includes:
a rod having a first end coupled to the deck obstruction and a second end opposite the first end;
a sleeve to telescopically receive the second end of the rod; and
a spring held in compression between the first end of the rod and the sleeve.

20. The apparatus of claim 19, wherein the spring is to urge the first connector to compress in length when the actuator moves the deck obstruction to the secured position.

21. The apparatus of claim 19, wherein the spring is in compression between a collar of the rod and an end of the sleeve.

22. The apparatus of claim 14, wherein the deck obstruction and the lip obstruction move simultaneously via the actuator.

23. The apparatus of claim 14, further including a pin to pivotally couple the lip obstruction to the deck and to guide rotational movement of the lip obstruction relative to the deck when the lip obstruction moves between the support position and the release position.

24. The apparatus of claim 14, wherein the deck obstruction includes a first deck obstruction and a second deck obstruction, the first deck obstruction to engage a first side of the platform and the second deck obstruction to engage a second side of the platform opposite the first side.

* * * * *